Figure 2:
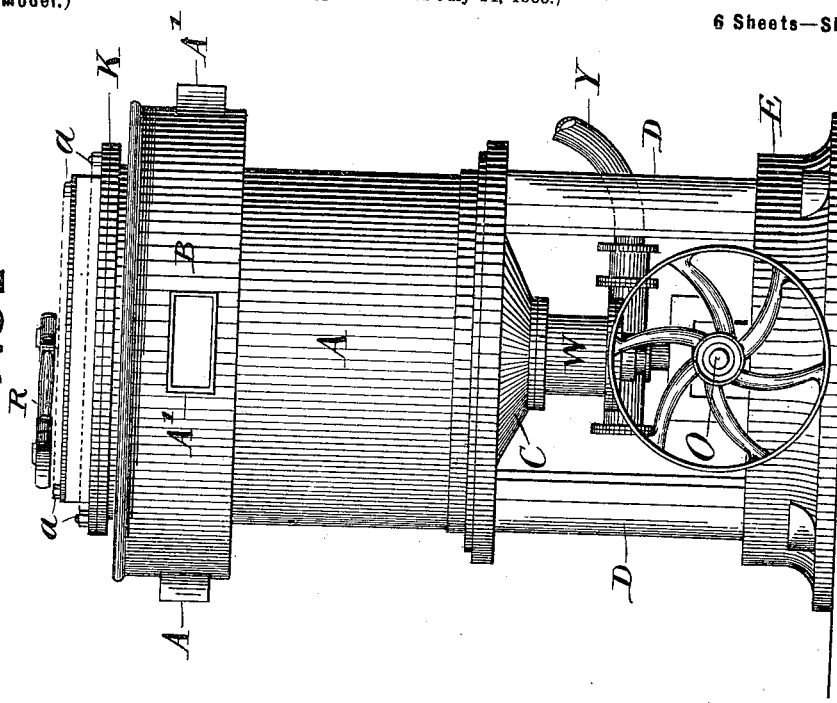

No. 666,365. Patented Jan. 22, 1901.
T. TORRANCE & J. H. HOWELL.
MACHINE FOR STRAINING PAPER PULP.
(Application filed July 14, 1900.)
(No Model.) 6 Sheets—Sheet 1.

WITNESSES:
Ella L. Giles
Otto Munk

INVENTORS.
Thomas Torrance
James Henry Howell
BY
Richardson
ATTORNEYS

No. 666,365. Patented Jan. 22, 1901.
T. TORRANCE & J. H. HOWELL.
MACHINE FOR STRAINING PAPER PULP.
(Application filed July 14, 1900.)
(No Model.) 6 Sheets—Sheet 2.

WITNESSES:
Ella L. Giles
Otto Munk

INVENTORS.
Thomas Torrance
James Henry Howell
BY
Richards
ATTORNEYS

No. 666,365. Patented Jan. 22, 1901.
T. TORRANCE & J. H. HOWELL.
MACHINE FOR STRAINING PAPER PULP.
(Application filed July 14, 1900.)
(No Model.) 6 Sheets—Sheet 3.

WITNESSES:
Ella L. Giles
Otto Munk

INVENTORS.
Thomas Torrance
James Henry Howell
Richards
ATTORNEYS

No. 666,365. Patented Jan. 22, 1901.
T. TORRANCE & J. H. HOWELL.
MACHINE FOR STRAINING PAPER PULP.
(Application filed July 14, 1900.)
(No Model.) 6 Sheets—Sheet 4.
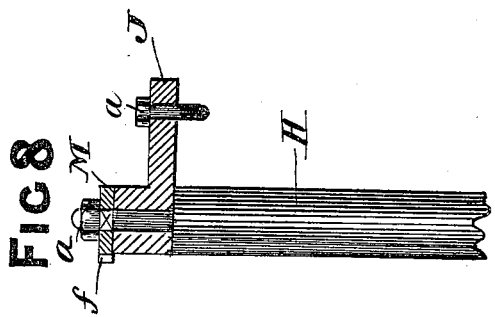
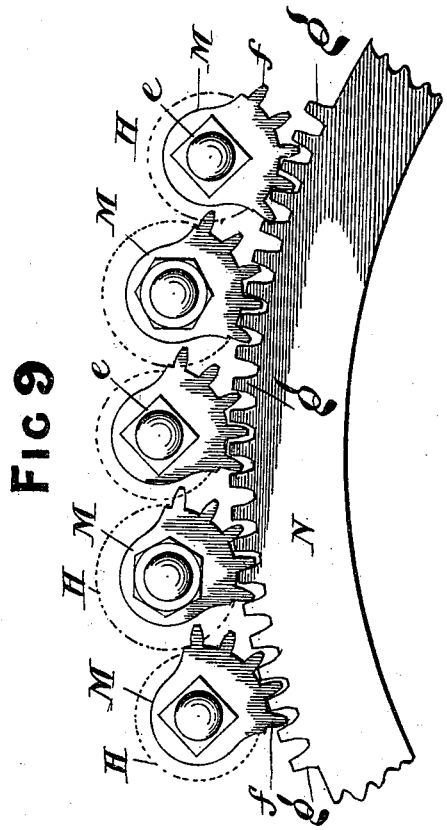
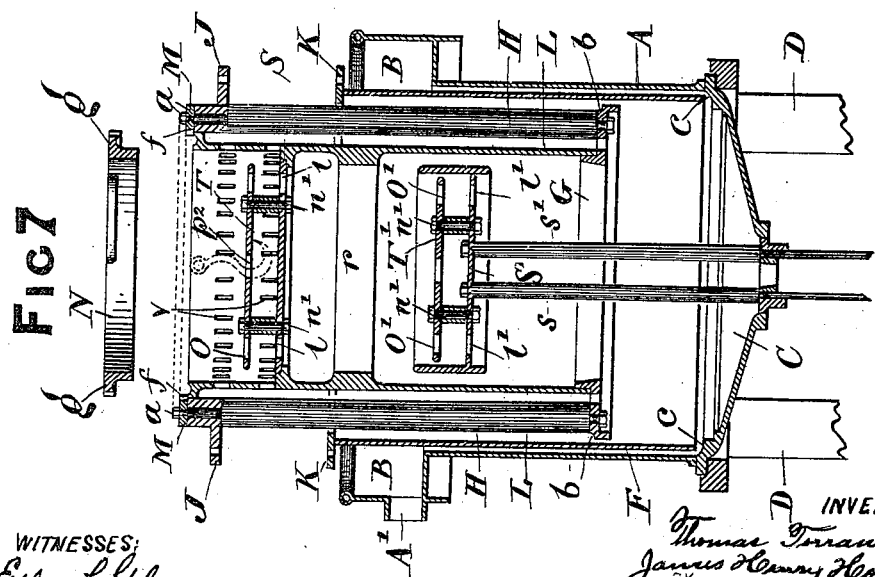
WITNESSES:
Ella L. Giles
Otto Munk
INVENTORS.
Thomas Torrance
James Henry Howell
BY
Richardson
ATTORNEYS

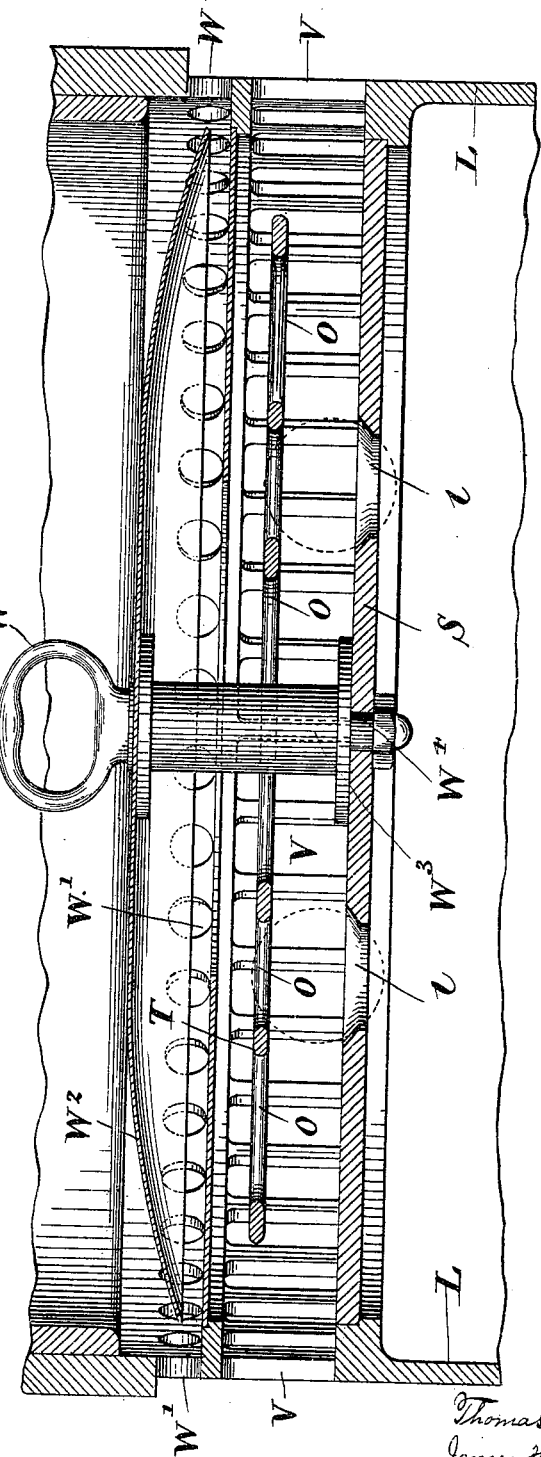

No. 666,365. Patented Jan. 22, 1901.
T. TORRANCE & J. H. HOWELL.
MACHINE FOR STRAINING PAPER PULP.
(Application filed July 14, 1900.)
(No Model.) 6 Sheets—Sheet 6.
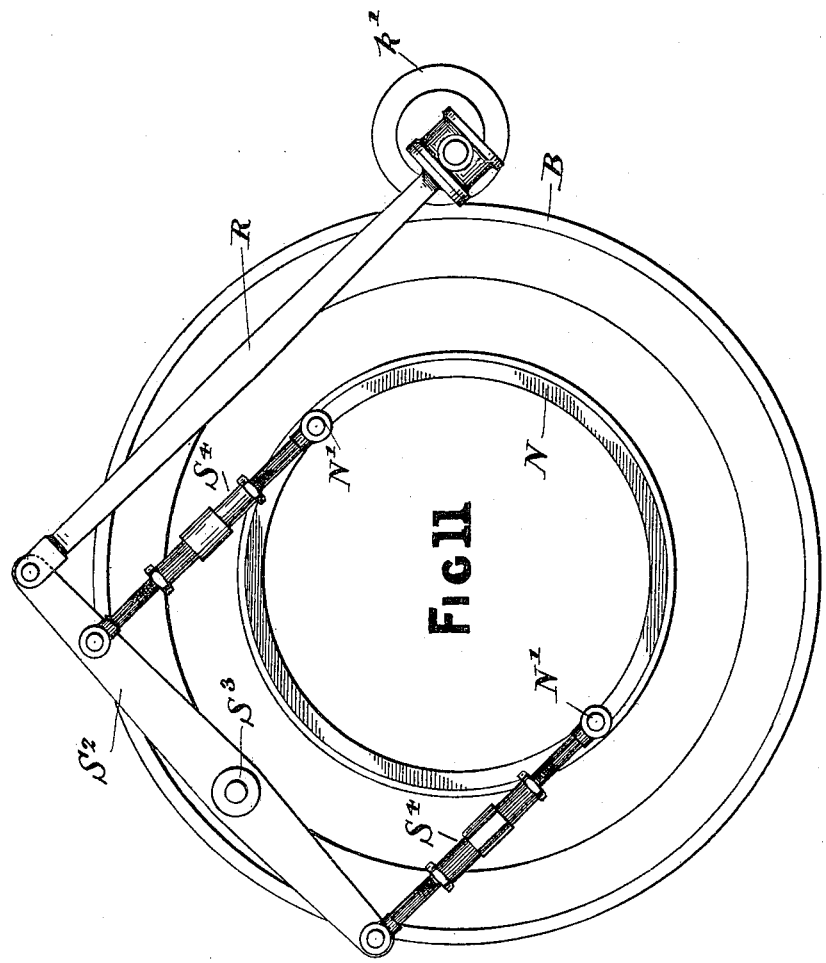
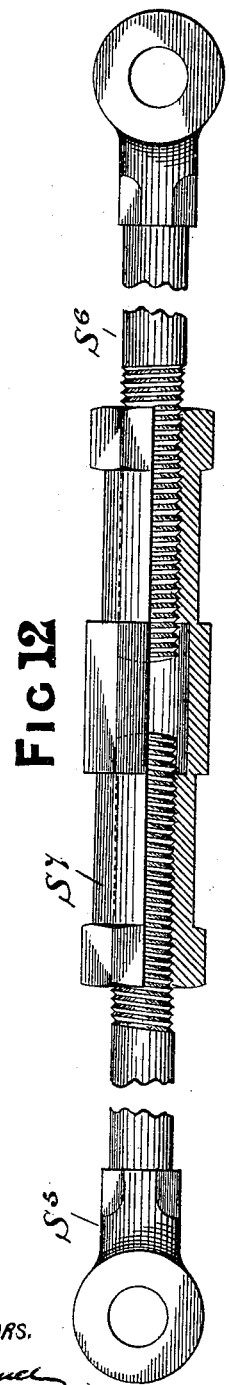
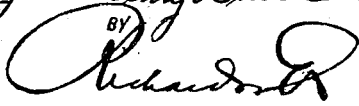

UNITED STATES PATENT OFFICE.

THOMAS TORRANCE, OF BITTON, AND JAMES HENRY HOWELL, OF BRISTOL, ENGLAND.

MACHINE FOR STRAINING PAPER-PULP.

SPECIFICATION forming part of Letters Patent No. 666,365, dated January 22, 1901.

Application filed July 14, 1900. Serial No. 23,693. (No model.)

*To all whom it may concern:*

Be it known that we, THOMAS TORRANCE, engineer, residing at Bitton Foundry, Bitton, and JAMES HENRY HOWELL, engineer, residing at 104 Pembroke road, Clifton, Bristol, in the county of Gloucester, England, subjects of Her Majesty the Queen of Great Britain, have invented a certain new and useful Machine or Apparatus for Straining Paper-Pulp, of which the following is a specification and for which application for patents are pending in France, No. 288,381, dated May 4, 1900; in Belgium, No. 118,327, dated May 4, 1900; in Germany, Serial No. 3,423, dated May 14, 1900, and in Great Britain, No. 8,963, dated May 15, 1900.

Our invention relates to an improved machine for straining or grading the pulp used in the manufacture of all kinds of paper, and has for its object to effect such straining or grading more effectually and expeditiously and at less cost than hitherto.

It is an indispensable condition in the manufacture of paper that the prepared pulp must pass through a straining process in order to remove therefrom all particles of foreign matter, lumps, or knots larger than the cut or space through which the pulp has to pass for making the required paper, and such pulp having a great tendency to coagulate and clog during this process a great difficulty has hitherto been experienced in preventing the straining medium of the machines hitherto made and used from becoming chocked or blocked, and we have found after lengthy experience and practice that the only means for effectually preventing such clogging is to keep the said pulp in a constant state of agitation during the straining process in order to prevent such coagulation, and we find by experiment that the machine or apparatus constituting the subject-matter of our present application for a patent attains the ends desired in a perfect and reliable manner.

In order that the description of our invention and the manner of its operation hereinafter contained may be fully and clearly understood, we have hereunto appended drawings, of which—

Figure 1:
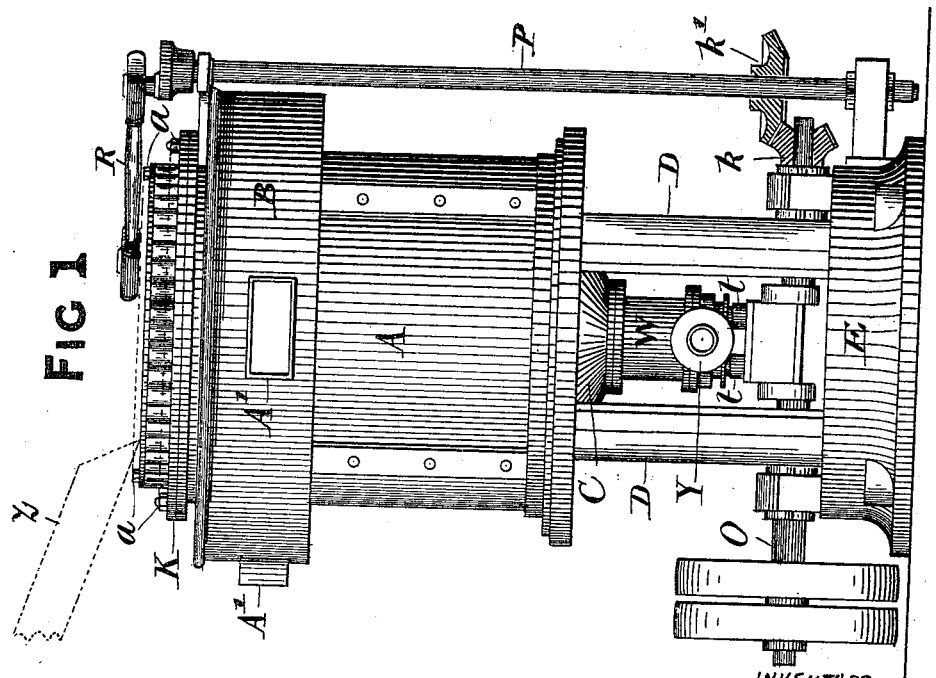
Figure 4:
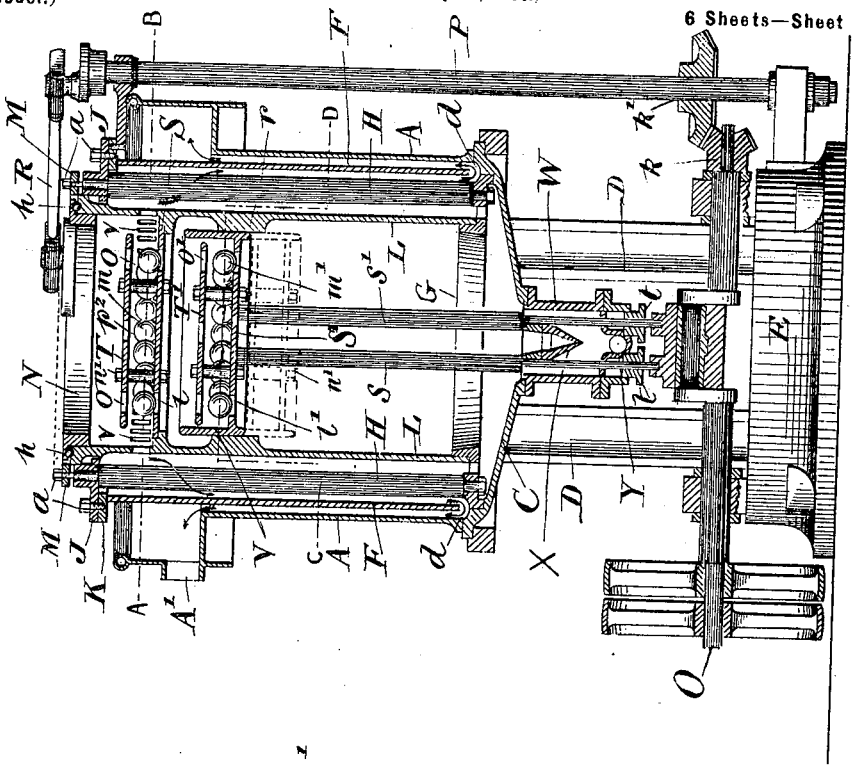
Figure 3:
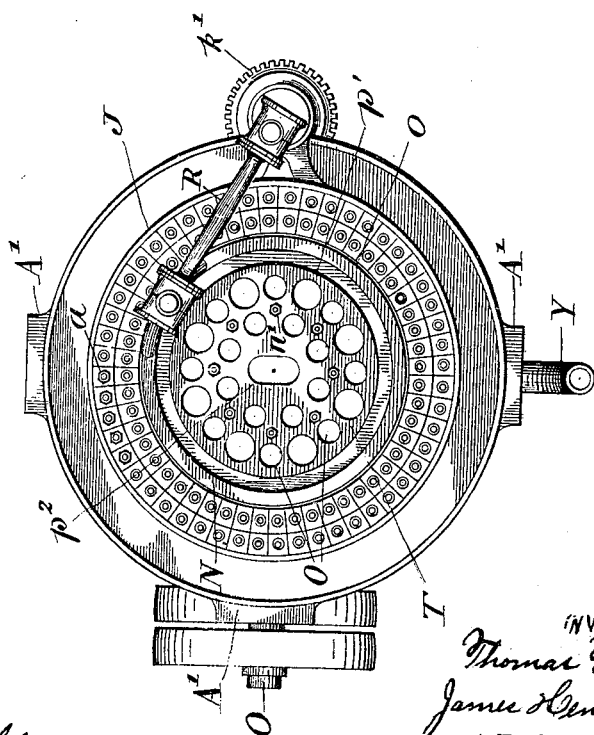
Figure 5:
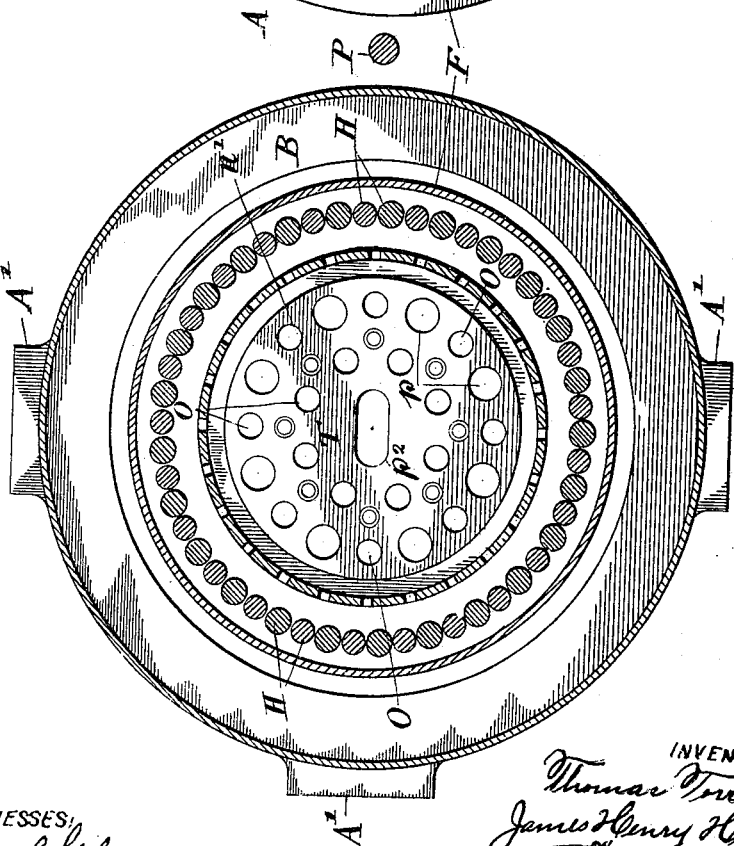

Figure 1 is an elevation of our complete machine or apparatus, partly in section, while Fig. 2 is a like elevation as it would appear when viewed from left to right of Fig. 1. Fig. 3 is a plan or top view, while Fig 4 is a central vertical section of the same. Fig. 5, Sheet 2, is an enlarged section of the same, taken upon the line A B, and Fig. 6 a like section taken upon the line C D of Fig. 4. Fig. 7 is a central vertical section like unto Fig. 4, but illustrating the manner in which the working parts or the interior of the said machine may be removed from its fixed case or container for the purposes of cleaning, repairs, and the like. Fig. 8 is an enlarged view illustrating the manner in which we find it most convenient to arrange the upper ends of the straining-rolls and the bearings therefor. Fig. 9 is a diagram or much-enlarged view of a portion of the plan view, Fig. 3, illustrating the manner in which an oscillatory motion is imparted to the whole set of rollers simultaneously, as hereinafter explained. Fig. 10 is an enlarged view illustrating an alternative method of arranging the upper end of the apparatus, while Figs. 11 and 12 are enlarged views illustrating an alternative method of actuating the to-and-fro motion of the ring or frame N, all of which will be hereinafter explained.

Our invention consists of a preferably cylindrical metallic outer casing A, the upper end of which is extended in diameter to provide an annular chamber B, the said case A at its lower end being connected to or arranged to provide a well or dish-like chamber C, the whole suitably supported upon standards D, mounted upon a base E. Within the said chamber A is a second cylinder F, the diameter of which is less than A, so that when fixed in position by connection in any suitable manner an annular space exists between A and F, the upper end of F being level with or slightly above the chamber B, while its lower and open end may terminate level with or slightly above the lower end of A.

The well C supports an annular ring or open frame G, so constructed and arranged as to provide bearings for the lower ends of a complete circle of rolls H, of any desired number, according to the capacity of the machine, but generally fifty or thereabout, the position of the said circle of rolls being such that an annular space exists between these and the cylinder F, which may conveniently be of about the same dimensions as that existing between A and F. The upper ends of the said rolls are borne by a like number of brackets J, arranged in a circle, Fig. 3, and fixed in position separately, preferably by the means of a screw-bolt $a$ to each, adapted to engage with an annular ring or its equivalent K upon the upper end of the machine, which provides that any one bracket J and its companion roll may be removed without disturbing the remainder.

The ring or frame G is bedded in the rim of the well C and is so arranged upon its outer periphery as to provide or form a demisemicircular groove $b$, while a like groove $c$ is formed in the rim of C, Fig. 7, so that when G is in position upon C a semicircular annular groove is formed by the junction of $b$ and $c$, as indicated by $d$ in Fig. 4, which occurs immediately below the lower end of the cylinder F and forms the only communication between the space between the rolls H and F and between F and A.

Within the circle of rolls H is a third cylinder L, the lower end of which is bedded in the ring or frame G, its upper end being steadied or fixed by the placing in position of the brackets J or by any other suitable or convenient means.

The upper bearing end of each of the rolls H is prolonged so as to extend for a suitable distance above its bracket J, and upon such extension $e$ (preferably rectangular in cross-section) is mounted a block or wheel M, the face of which, pointing toward the interior of the machine, has any number of cogs or teeth $f$, which gear with like teeth $g$, formed upon the outer periphery of a frame or ring N, adapted to freely partly rotate or oscillate upon the upper end of the cylinder L upon a series of small metal balls $h$, running in a race formed in N and L. The general formation of the toothed blocks or wheels M and the manner of their engagement with the ring or circular frame N is more graphically shown in Fig. 9, from which it will be understood that if a partial to-and-fro rotary motion be imparted to N an oscillatory motion would be thereby imparted to the blocks or wheels M, and consequently the rolls H upon which they are mounted.

In suitable bearings upon the base E is mounted a crank-shaft O, receiving motion from any convenient or available source, the said crank-shaft, by the means of gear-wheels $k$ and $k'$, imparting rotary motion to a vertical shaft P, to the upper end of which is eccentrically connected one end of a horizontal rod R, the opposite end of which said rod is in pivotal connection with the ring or circular frame N, from which it will be understood that by the rotation of the shaft P a to-and-fro rotary motion is imparted to the ring or frame N and through this and the block M an oscillatory motion to the rolls H.

The cylinder L carries at its upper end a diaphragm S, in which is provided a circle of any number of circular holes $l$, and in these are placed a like number of rubber or rubber-faced balls $m$, and at a distance above this ball diaphragm S sufficient to prevent the said balls from entirely leaving the holes $l$ is mounted and fixed (preferably by bolts $n'$) a circular plate T, in which are formed circular holes $o$, corresponding in number to and immediately over the holes $l$ in S, the said holes $o$ being to receive the balls $m$ as they rise from and keep them in position for returning to the holes $l$, as hereinafter explained, and between the said holes $n$ in T are other and preferably larger holes or pulp-passages $p'$ and a central aperture $p^2$; but there are no holes or apertures corresponding to these in the diaphragm S.

The cylinder L is adapted at $r$ to form a guide for a piston V, consisting of a diaphragm S' with holes $l'$ and balls $m'$, and fixed above this is a circular plate T', having holes $o'$ and $p'$ exactly the same as that described with regard to the diaphragm S and plate T. This ball-piston V has preferably two rods $s$ $s'$, which pass down through slotted or other guides in the upper end and glands $t$ at the lower end of a chamber W, connected to the lower mouth of the well or dish C, the lower extremities of the said piston-rods being connected to a frame encircling the crank of the crank-shaft O. The upper end of the chamber W is provided with a valve X, while the lower end of the said chamber has an exhaust or outlet pipe Y, which may or may not be provided with a suitable by-pass.

The cylinder L is provided with holes or slots $v$ for the escape of the material to be strained.

Figure 6:
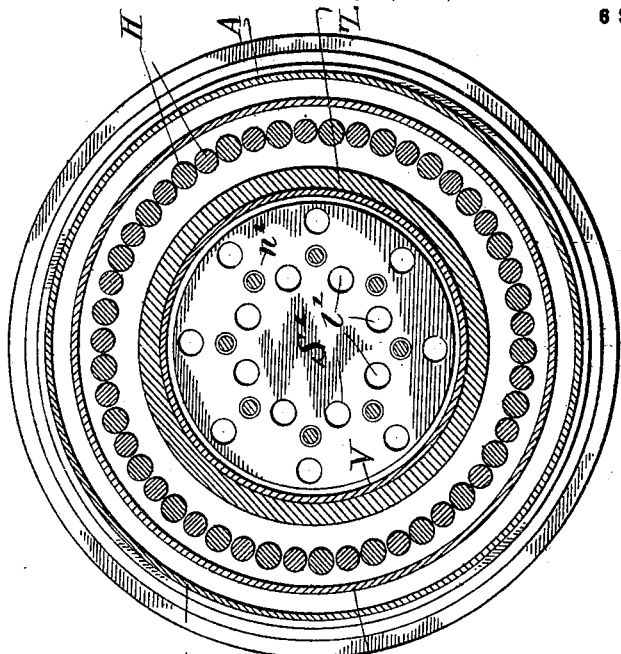

The manner of operation is as follows: The pulp to be treated would be fed by a chute Z, Fig. 1, or by other suitable means into the upper end of the apparatus directly onto the plate T and diaphragm S, from which it would pass through holes or slots $v$ in the cylinder L down into the space between L and the rolls H, the said rolls, it is understood, being oscillated by and through the motions of the wheels or blocks M and ring N, actuated by the rod R through the shaft P, and the pulp outside L would be kept agitated or stirred constantly by the motion of the said rolls, between which it would percolate and enter the space between these and the cylinder F, and flow down and pass under the lower end of F into the space between this and the outer case A, in which it would rise and enter the annular chamber B and flow from this through one or all of any number of openings A' and be conveyed therefrom to where required, which may be into suitable vats or directly to and upon the wet end of the paper-making machine. The direction of the travel of the strained pulp is indicated by arrows in Fig. 4. The thick, heavy, or knotty pulp or other foreign matter not capable of passing between the rolls H would fall into the dish or well C and rise up in the cylinder L until its level was within the field of operation of the piston V, when at each downstroke of V the said pulp in L would raise the balls $m'$ and pass up through the holes $l'$ in the diaphragm S', the so-raised balls being arrested by the holes in the plate T', and by the said downstroke of V the suction caused thereby would operate to place the balls $m$ over and closing the holes $l$ in the plate T, and by the return or up stroke of the piston or pump V the balls $m'$ would close down upon the holes $l'$ in S' and the pulp above S' be forced up through the holes $l$ in the plate S, thus raising the balls $m$ thereon, which would be arrested by the holes $n$ in the plate T, and the continued motion of the said pump and the continual lifting of the pulp in L would keep the said pulp in a constant or intermittent state of agitation due to each stroke of the piston, so that coagulation becomes impossible, and the said pulp as so forced up above the diaphragm S would or may be also forced through the holes $p$ and $p^2$ in the plate T, and by mixing with the fresh pulp entering at Z would again flow through the slots or holes $v$ and be again presented to the rolls H, and such pulp as would pass between these and be fit for use would again flow in the direction of the arrows, as before described, the unfit again entering the cylinder L to undergo the same treatment as before. The thickest of the pulp entering the well C would be too dense or heavy to rise in the cylinder L, but would fall and rest upon the valve X, which would at each upstroke of the piston V be closed by suction; but at each downstroke of the pump the said valve would open and the dirty or heavy pulp be passed down therethrough and be forced out through the discharge-pipe Y and be conveyed therefrom to the beaters to be again operated upon thereby and eventually be again passed into the apparatus and treated as before described. The space between any one of the rolls H and its neighbors would be equal to that between all the others, and such distance would represent the grade of the pulp or the cut of the paper to be made therefrom, and as such space may need to be sometimes enlarged and sometimes lessened, according to the cut or grade of the paper being made, we prefer to arrange the series of rolls H of greater and lesser cross-sectional diameter alternately, as shown in Figs. 5 and 6, which provides that when the cut or grade needs to be enlarged the rolls of the larger diameter may be removed and those of smaller diameter substituted therefor, and in like manner when the cut or grade needs to be lessened the rolls having the smallest diameter may be removed and the larger ones only be used in substitution thereof.

The interior of the apparatus or machine being so constructed as to be removed from its casing to effect repairs, cleaning, or what not we illustrate in Fig. 7 that by the means of a crane or derrick rigged up over the machine and the hooks of the chain thereof passed through the aperture $p^2$ in the plate T, as indicated by dotted outline, the whole of the interior may be removed, as shown in said Fig. 7.

In Fig. 10 we illustrate an alternative method of arranging the upper portion of the apparatus when found more convenient or when constructing machines of large capacity and for dealing more effectually with a larger quantity or flow of pulp. In this arrangement we provide above the slits or openings $v$ in the casing L a like or a suitable number of circular or other shaped holes W', through which the pulp may flow should it be in excess of that exuding through the slots $v$, and which also provides that the pulp may enter the space between the casing L and the rolls H at a greater height, so as to provide a larger area for straining the pulp, and to facilitate the distribution of the pulp when first delivered from the chute Z and direct it toward the apertures $v$ and W' we may provide a dome-shaped cover $W^2$, upon which the pulp may be first delivered and flow off the sloping edges of this close to the said apertures and beneath the said cover onto the diaphragm T. The said cover $W^2$ may conveniently be supported by the means of a double-flanged block $W^3$, through which may pass a bolt $W^4$, secured by a nut or nuts to the fixed diaphragm S, the upper end of the said bolt being provided with an eye $W^5$ for receiving the hook of the tackle previously mentioned for lifting out the inner portion of the apparatus, as described and illustrated by Fig. 7.

In machines of large capacity we may find that the oscillating ring N may have a tendency to jam or jar when actuated by a single connection with the rod R, and to obviate this we provide, as illustrated by Figs. 11 and 12, a link $S^2$, fulcrumed upon the machine at a point $S^3$ and at a suitable distance at each side of the said point pivotally connected to the ends of adjustable rods $S^4$, the opposite ends of which are pivotally connected to the ring or frame N at points N' diametrically opposite to each other, while the free and extended end of the link $S^2$ is pivotally connected to the rod R. By this arrangement the reciprocating motion of the rod R would impart a rocking motion to the link $S^2$, while the said link would impart a push and pull upon the rods $S^4$ alternately and actuate the ring or frame N in the same manner as previously described, but more evenly and without jam or jar. The said rods $S^4$ may be rendered adjustable in length by forming them each in two parts $S^5$ and $S^6$, provided, respectively, with a right and left hand thread, the said threaded portions being embraced by a right and left hand threaded nut or tube $S^7$, as illustrated by Fig. 12.

Having now particularly described and ascertained the nature of our said invention and in what manner the same is to be performed, we declare that what we claim is—

1. In combination in an apparatus for straining pulp, a series of straining-rolls and reciprocating means for agitating the material before passing through the said rolls, substantially as described.

2. In combination, in an apparatus for straining pulp, a series of straining-rolls set parallel and vertically and arranged in a circle and means within the circle of rolls for agitating the material, said means reciprocating parallel with the axes of the rolls, substantially as described.

3. In combination an outer case, an annular chamber about the case having outlets, a well at the lower end of the case, a cylindrical casing F inclosed by the outer case and communicating therewith, a circle of rolls within the case F, means for oscillating the said rolls and means for supplying the material to the casing within the circle of rolls substantially as described.

4. In combination the outer casing, a series of rolls within the same and means for oscillating the rolls comprising the toothed wheels on the rolls, a toothed ring or frame N, a rod R connected to the ring, a vertical shaft P, an eccentric connection between the shaft and rod, and the crank-shaft and gearing for rotating the vertical shaft, substantially as described.

5. In combination with the casing and the straining-rolls therein, agitating means for the material comprising a cylinder L arranged within the circle of rolls, a ball-valve piston operating within the cylinder L, means for operating the piston, a ball-valve diaphragm arranged within the cylinder, said cylinder having openings above the diaphragm for the passage of the agitated material, a valve controlling the escape of the unstrained pulp, said valve operating in conjunction with and being affected by the pressure from the piston, substantially as described.

6. In combination, the circle of straining-rolls, the casing around the rolls having an outlet-passage for the strained pulp at the lower edge thereof, an inner cylinder L within the circle of the rolls, agitating means within the inner cylinder, said cylinder being open at its upper and lower ends to the space between it and the circle of rolls, substantially as described.

7. In combination, the casing, a circle of rolls and means for oscillating the same comprising the toothed ring, a lever $s^2$, a pair of adjustable rods connecting the same with the toothed ring, a rod R for operating the lever and means for giving the rod a reciprocating movement, substantially as described.

8. In combination, a cylinder L having a series of openings, a ball-valve diaphragm within the cylinder and below the openings, a pump within the cylinder having a ball-valve piston, a series of rolls about the cylinder, a shaft $o$ for operating the pump, a valve X at the bottom of the cylinder adapted to open and close under the pressure and suction from the pump and a chamber into which the valve discharges, substantially as described.

In witness whereof we have hereunto set our hands in presence of two witnesses.

THOMAS TORRANCE.
JAMES HENRY HOWELL.

Witnesses:
HENRY COOKE,
ANDREW WOOD WILKINSON.